(12) United States Patent
Balaban et al.

(10) Patent No.: US 10,203,475 B2
(45) Date of Patent: Feb. 12, 2019

(54) CURVED MAGNETIC ACTUATORS, AND SYSTEMS, AND METHODS FOR MOUNTING TILT PLATFORMS

(71) Applicant: Raytheon Company, Waltham, MA (US)

(72) Inventors: Scott Balaban, Los Angeles, CA (US); Christopher A. Cox, Torrance, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/299,306

(22) Filed: Oct. 20, 2016

(65) Prior Publication Data

US 2018/0113277 A1   Apr. 26, 2018

(51) Int. Cl.
G02B 7/182 (2006.01)
H01F 7/02 (2006.01)
H01F 7/06 (2006.01)
H01F 7/08 (2006.01)
H01F 7/122 (2006.01)

(52) U.S. Cl.
CPC ............. *G02B 7/182* (2013.01); *H01F 7/02* (2013.01); *H01F 7/0221* (2013.01); *H01F 7/06* (2013.01); *H01F 7/081* (2013.01); *H01F 7/122* (2013.01)

(58) Field of Classification Search
None
See application file for complete search history.

(56) References Cited

U.S. PATENT DOCUMENTS 4,175,550 A   11/1979   Leininger et al.
4,331,991 A    5/1982   Morehouse et al.
(Continued)

FOREIGN PATENT DOCUMENTS

EP   1321822 A1   6/2003
JP   02-051121    2/1990
(Continued)

OTHER PUBLICATIONS

Ball Aerospace; Ball Aerospace Delivers 500 Tactical Fast Steering Mirrors for Guardian Program; Ball Aerospace News Release; Dec. 9, 2008; 2 pages; Ball Aerospace.
(Continued)

*Primary Examiner* — Jennifer D. Carruth

(57) ABSTRACT

A magnetic actuator, comprising a first magnet having a first magnetic axis and having a first magnetic field, a second magnet having a second magnetic axis and having a second magnetic field, the first and second magnets defining, at least in part, a magnetic assembly; and a coil actuator assembly at least partially disposed about the magnetic assembly, wherein the first and second magnetic fields collectively approximate a curve. A tilt platform assembly, comprising a support base: a tilt platform pivotally coupled to the support base: at least one coil actuator assembly, mounted to one of the support base or the tilt platform; and at least one magnet assembly mounted to the other of the support base or tilt platform, and being disposable within the at least one coil actuator assembly, the at least one magnetic assembly comprising at least two magnets having respective magnetic fields angularly offset from one another and that collectively approximate a curve.

25 Claims, 10 Drawing Sheets

(56) References Cited

U.S. PATENT DOCUMENTS

| | | | |
|---|---|---|---|
| 4,732,440 | A | 3/1988 | Gadhok |
| 4,758,091 | A | 7/1988 | Bodine |
| 4,835,643 | A | 5/1989 | Schulze |
| 5,110,195 | A | 5/1992 | Loney |
| 5,167,464 | A | 12/1992 | Voellmer |
| 5,177,640 | A | 1/1993 | Grassens |
| 6,194,796 | B1 | 2/2001 | Yeakley |
| 6,837,587 | B1 | 1/2005 | Hughes |
| 6,856,437 | B2 | 2/2005 | Witt et al. |
| 7,009,752 | B1 | 3/2006 | Lorell et al. |
| 7,586,660 | B2 * | 9/2009 | Itami ............ G02B 26/121 310/180 |
| 7,640,648 | B1 * | 1/2010 | Rittenhouse ........ H02K 1/145 29/596 |
| 9,354,422 | B1 | 5/2016 | Quakenbush |
| 2002/0179792 | A1 | 12/2002 | Wu et al. |
| 2003/0197910 | A1 | 10/2003 | Witt et al. |
| 2004/0245864 | A1 | 12/2004 | Bailey |
| 2005/0046979 | A1 | 3/2005 | Hiley et al. |
| 2008/0240706 | A1 | 10/2008 | Akiba |
| 2009/0302251 | A1 | 12/2009 | Caldwell |
| 2009/0322165 | A1 * | 12/2009 | Rittenhouse ........ H02K 1/2786 310/43 |
| 2012/0091847 | A1 * | 4/2012 | Fullerton ............. H02K 21/24 310/156.35 |
| 2012/0262019 | A1 | 10/2012 | Smith et al. |
| 2012/0320596 | A1 | 12/2012 | Hastings |
| 2014/0268383 | A1 | 9/2014 | Bullard et al. |

FOREIGN PATENT DOCUMENTS

| | | |
|---|---|---|
| JP | 2006-068688 | 3/2006 |
| JP | 2008-125289 A | 5/2008 |

OTHER PUBLICATIONS

Ball Aerospace & Technologies Corp.; Fast-Steering Mirrors; http://web.archive.org/web/20110104192032/http://www.ballaerospace.com/page.jsp?page=. . . ; archived online Jan. 4, 2011; 1 page; Ball Aerospace.

Ball Aerospace & Technologies Corp.; Wide Angle Steering Mirror; Ball Aerospace brochure; Aug. 2010; 2 pages; Ball Aerospace & Technologies Corp.

Berta et al, "Development of a commercial line of high-performance, fast-steering mirrors", Ball Aerospace & Technologies Corp., Jul. 1999, 12 pages.

C-Flex Bearing Co., Inc.; Frictionless, Low Hysterics Bearing for Angular Applications; C-Flex Bearing Co. brochure; Mar. 22, 2011; 5 pages; C-Flex Bearing Co., Inc.

Henderson, "Commercial Fast Steering Mirrors", Optics in Motion LLC, Sep. 2009, 12 pages.

H2W Technologies, Inc., Limited Angle Torque Motors, https://www.h2wtech.com/category/limited-angle-torque#productInfo1, to the best of applicant's knowledge article was available before the application filing date, 3 pages, Santa Clarita, CA.

Jianmin et al, "Research on Shaftless Fast-steering Mirror Used in a Precision Tracking-Aiming System", $3^{rd}$ International Symposium on Advanced Optical Manufacturing and Testing Technologies: Large Mirrors and Telescopes, 2007, vol. 6721, 6 pages.

Kaplan, "Fast steering mirror performance measurements", United Technologies Optical Systems Inc., Jun. 2011, vol. 1920, 12 pages.

Left Hand Design Corporation; Fine-Steering Mirrors; http://web.archive.org/web20110627163936/http://lefthand.com/prod_fsm.aspx ; archived online Jun. 27, 2011; 2 pages; Left Hand Design Corporation.

Loney, "Design and performance of a small two-axis high-bandwidth steering mirror", Beam Deflection and Scanning Technologies, 1991, vol. 1454, 9 pages.

Meline et al, "Universal beam steering mirror design using the cross blade flexure", Acquisition, Tracking, and Pointing VI, 1992, vol. 1697, 19 pages.

Morgan et al, "Large, high performance, fast steering mirrors with FPGA-embedded controls", Advanced Wavefront Control: Methods, Devices, and Applications, 2009, vol. 7466, 10 pages.

Optics in Motion; Fast Steering Mirror—Models OIM3300; User's Manual; Apr. 2, 2007; 11 pages; Revision B; Optics in Motion.

Shen et al, "Large angle fast steering mirrors", Active and Adaptive Optical Components, 1991, vol. 1543, 8 pages.

Sweeney et al, "Design Considerations for Fast Steering Mirrors (FSM's)", Axsys Technologies Imaging Systems, 11 pages.

Tapos et al, "High bandwidth fast steering mirror", Optomechanics, 2005, vol. 5877, 14 pages.

Wu et al, "High-powered voice coil actuator for fast steering mirror", Optical Engineering, Feb. 2011, vol. 50, No. 2, 5 pages.

Invitation to Pay Additional Fees for International Application No. PCT/US2017/046600 dated Nov. 21, 2017, 27 pages.

International Search Report for International Application No. PCT/US2017/046600 dated Mar. 15, 2018, 31 pages.

* cited by examiner

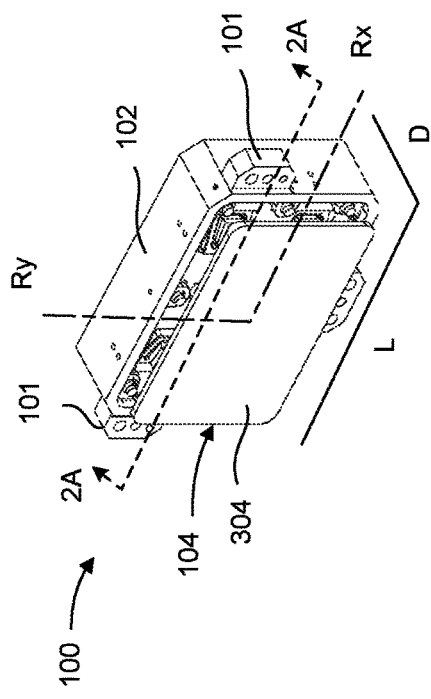
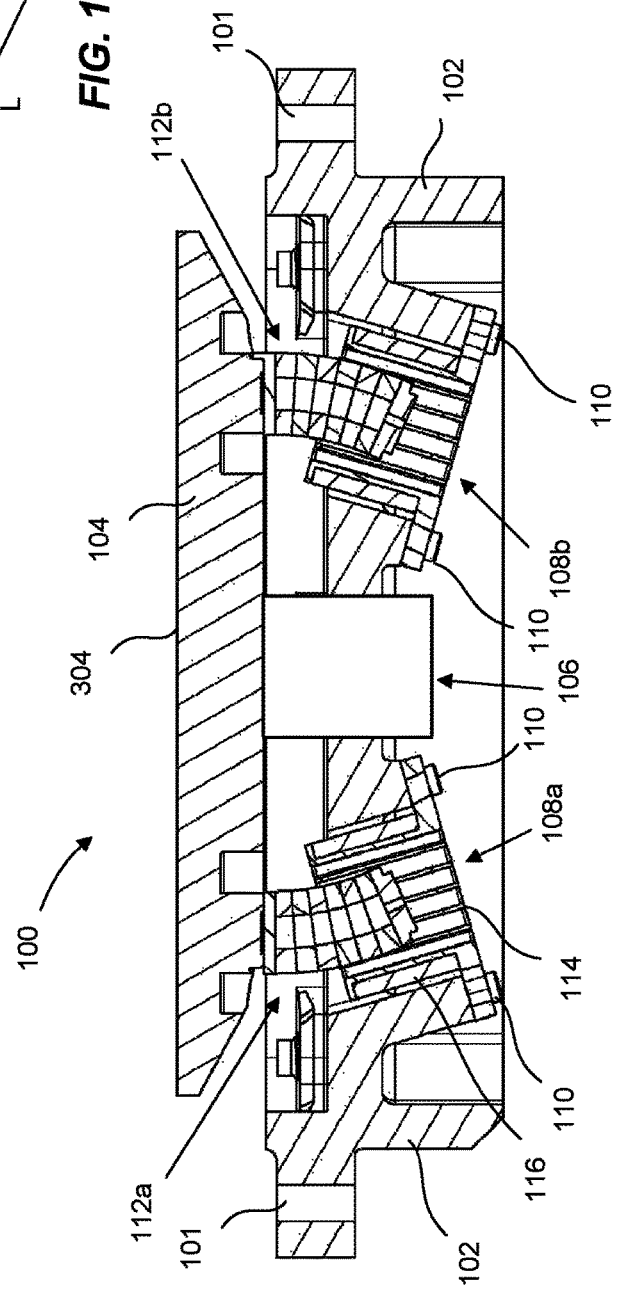
FIG. 1
FIG. 2A

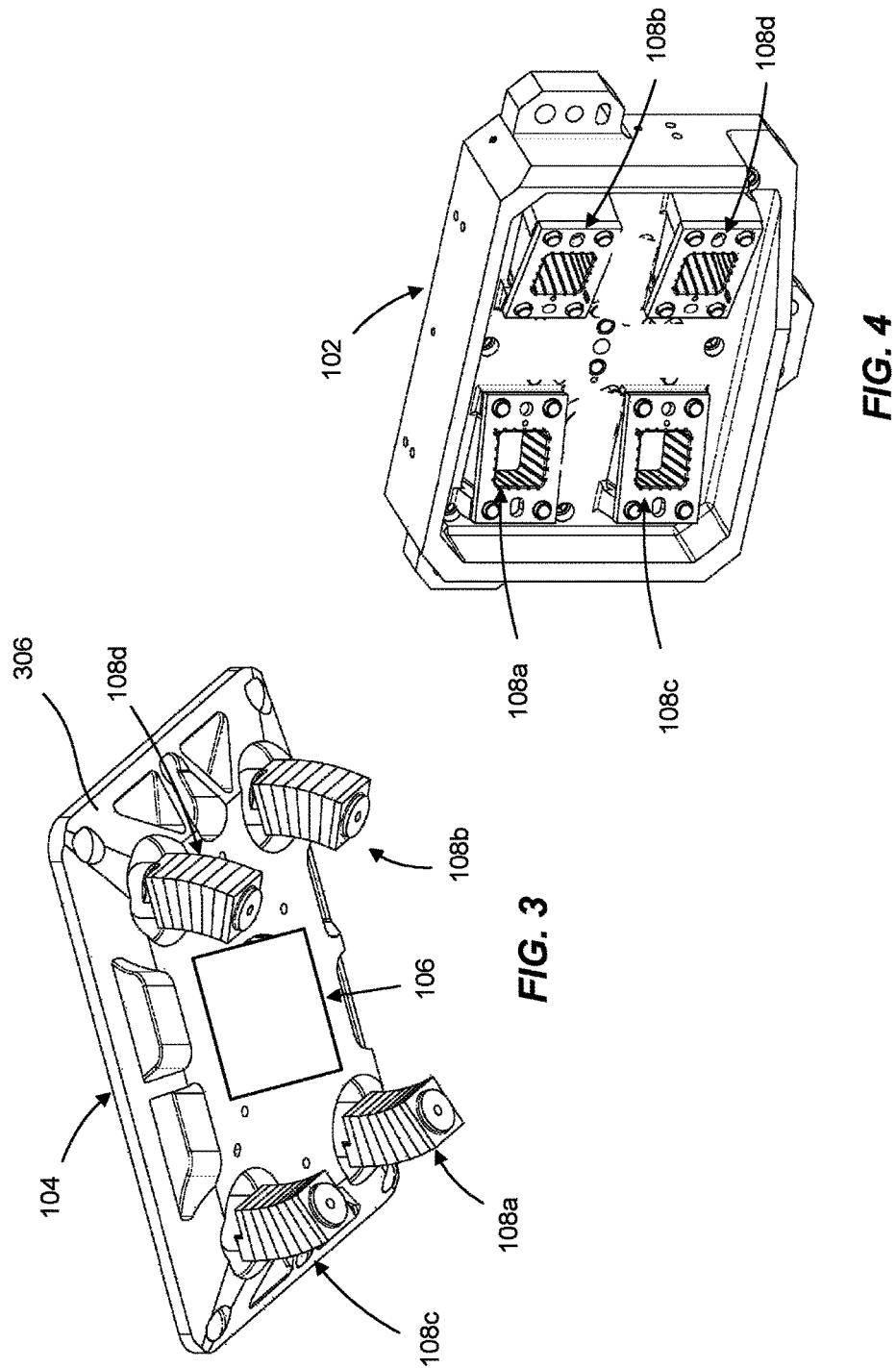

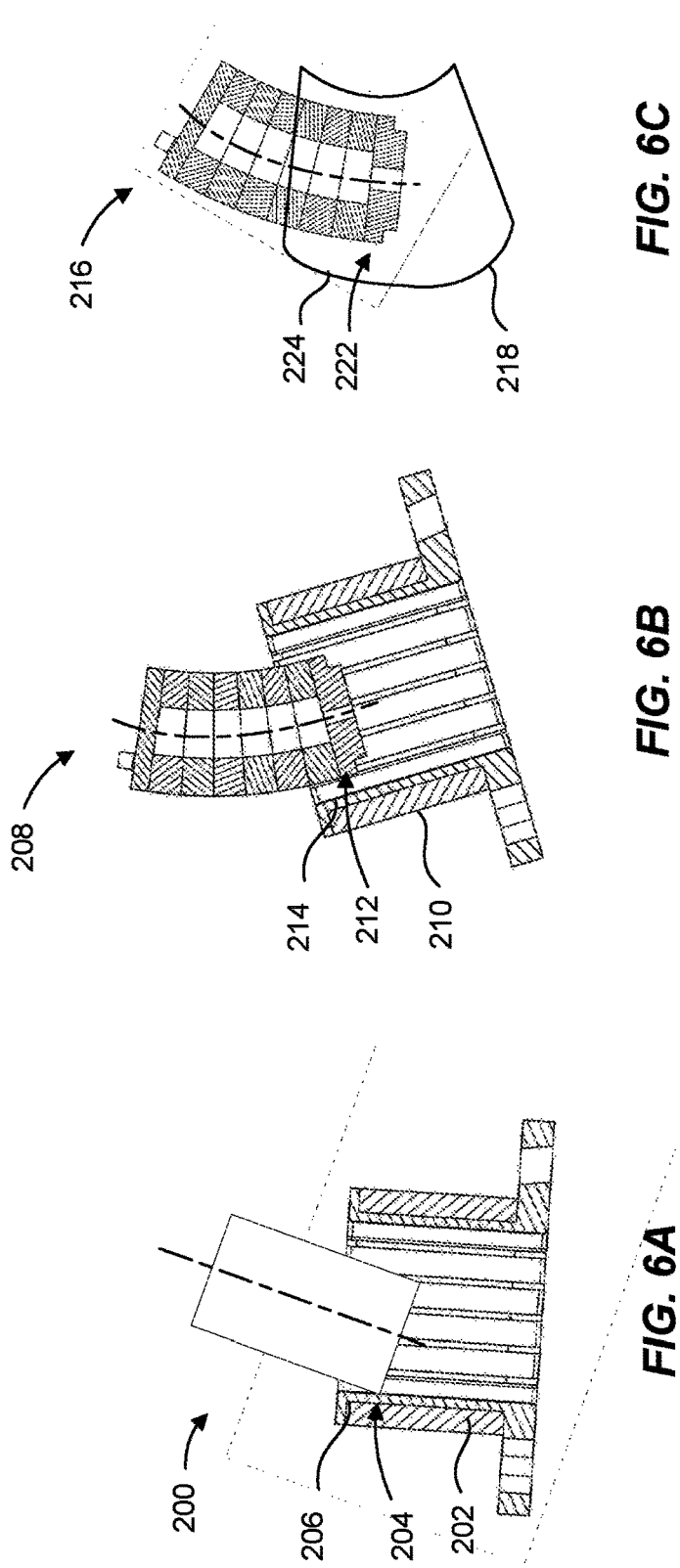

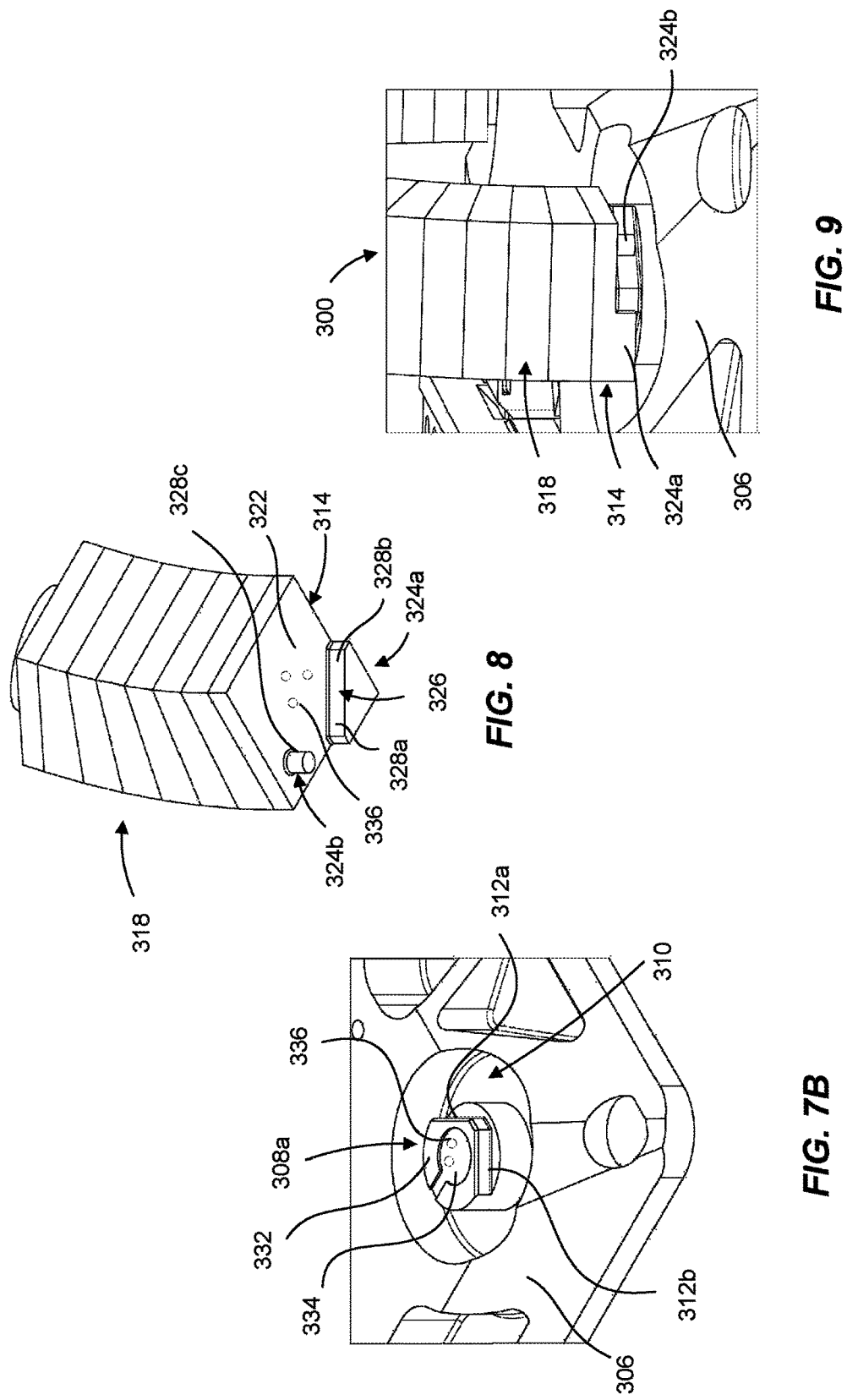

CURVED MAGNETIC ACTUATORS, AND SYSTEMS, AND METHODS FOR MOUNTING TILT PLATFORMS

BACKGROUND

Various magnetic actuators have been implemented in certain applications to actuate and/or pivot a component, such as an optical device. As pertaining to optical devices, some applications require highly accurate and repeatable actuation to actuate or tilt a platform, for example, a mirror of a fast steering mirror assembly. In most cases, it is desirable to maximize the acceleration of a fast steering mirror assembly. This is particularly the case for optical devices in satellite or telescope applications.

Prior attempts have been made to implement a magnetic actuator within an optical device having a mirror, wherein the magnetic actuator comprises a singular straight magnet disposable through or positioned relative to a coil assembly, the magnetic actuator facilitating actuation of the mirror. However, as a straight magnet travels/rotates relative to its coil assembly, the straight magnet requires sufficient clearance to move freely within the coil assembly to achieve a desired tilt travel of the mirror. To accommodate the needed clearance, relatively large coil assemblies are designed and implemented to achieve the desired movement of the straight magnet about the coil assembly.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1 shows an isometric view of a fast steering mirror assembly, in accordance with an example of the present disclosure;

FIG. 2A shows a cross-sectional view of the fast steering mirror assembly of FIG. 1 about lines 2A-2A;

FIG. 3 shows an isometric view of a first portion of a pivot tilt assembly of the fast steering mirror assembly shown in FIG. 2A;

FIG. 4 shows an isometric view of a second portion of the pivot tilt assembly of the fast steering mirror assembly shown in FIG. 2A;

FIG. 6A shows a cross-sectional view of a straight magnetic actuator as known in the prior art;

FIG. 6B shows a cross-sectional view of a curved magnetic actuator assembly, in accordance with an example of the present disclosure;

FIG. 6C shows a cross-sectional view of a curved magnetic actuator, in accordance with an example of the present disclosure;

FIG. 7B shows an isometric view of a pedestal of a tilt platform assembly, such as that shown in FIG. 7A, in accordance with an example of the present disclosure;

FIG. 8 shows an isometric view of a mount device of a magnetic assembly, such as that shown in FIG. 1, in accordance with an example of the present disclosure;

FIG. 9 shows an isometric view of an interface between the mount device of FIG. 8 and the platform of FIG. 7B, in accordance with an example of the present disclosure;

Figure 2B:
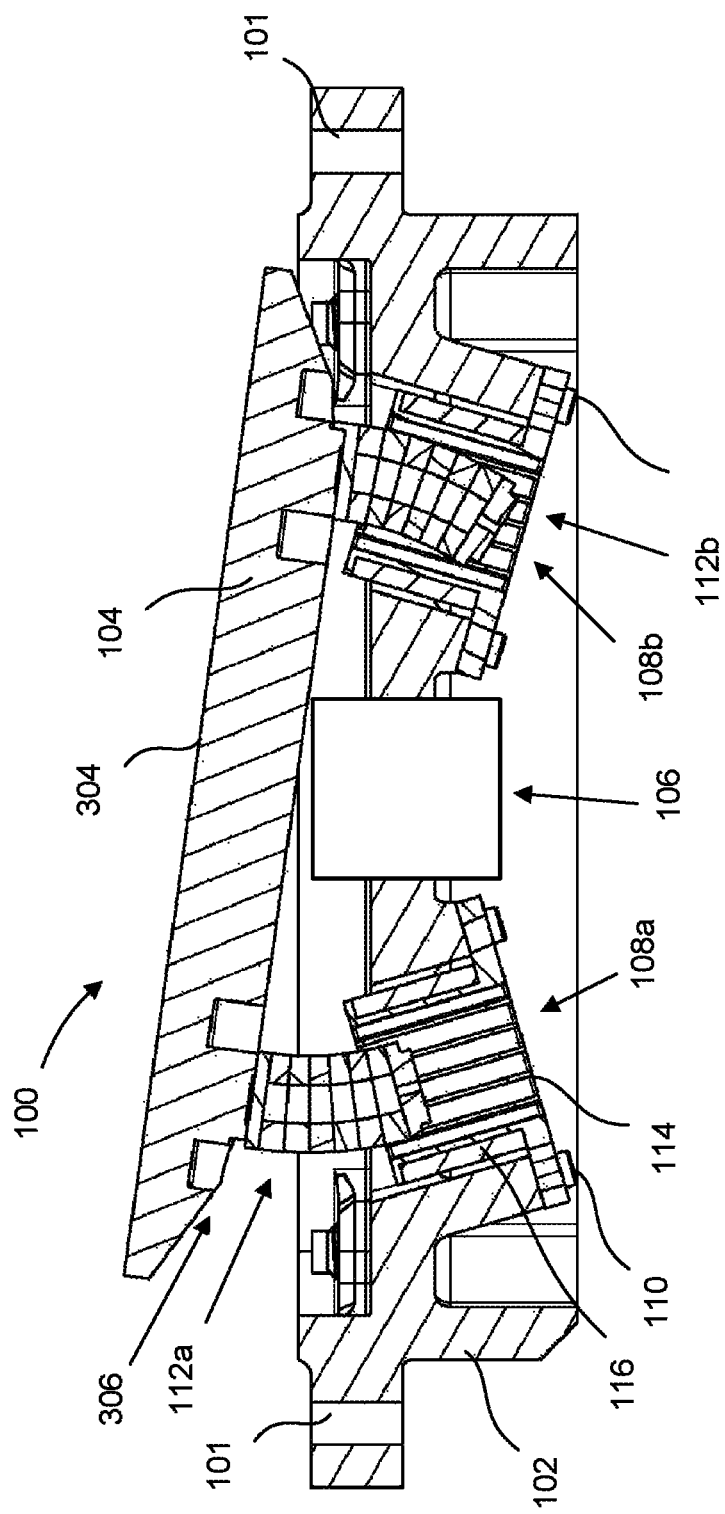
FIG. 2B shows the cross-sectional view of the fast steering mirror assembly shown in FIG. 2A in a tilted configuration.

Reference will now be made to the exemplary examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

An initial overview of technology examples is provided below and then specific technology examples are described in further detail later. This initial summary is intended to aid readers in understanding the technology more quickly but is not intended to identify key features or essential features of the technology nor is it intended to limit the scope of the claimed subject matter.

In one example of the present disclosure there is provided a magnetic actuator. The actuator can comprise a first magnet having a first magnetic axis and having a first magnetic field, and a second magnet having a second magnetic axis and having a second magnetic field. The first and second magnets can define, at least in part, a magnetic assembly. A coil actuator assembly can be at least partially disposed about the magnetic assembly. The magnets can be arranged in the magnetic assembly such that the first and second magnetic fields collectively approximate a curve, wherein the magnetic assembly essentially comprises an effectively curved magnetic field.

In some examples of the magnetic actuator, the first magnet is positioned relative to the second magnet to angularly offset the respective magnetic axes.

In some examples of the magnetic actuator, the magnetic assembly comprises a plurality of magnets stacked on each other and each having a tapered cross-section.

In some examples of the magnetic actuator, each magnet comprises a wedge-shaped configuration.

In some examples of the magnetic actuator, each magnet comprises an outer surface height dimension greater than an inner surface height dimension.

In some examples of the magnetic actuator, each magnet comprises opposing curved surfaces that combine to curve the magnet assembly.

In some examples of the magnetic actuator, the actuator further comprises a plurality of stacked magnets to at least partially form the magnetic assembly, wherein each magnet of the magnetic assembly has a magnetic axis, and wherein at least some of the magnetic axes are angularly offset from one another.

In some examples of the magnetic actuator, the actuator comprises an attachment pole piece secured to an end of the magnetic assembly. The attachment pole piece can comprise at least two alignment components that interface with respective first and second support surfaces of a platform, the at least two alignment components being arranged to facilitate self-alignment of a mount device relative to the platform, and the at least two alignment components being configured to restrict movement of the mount device relative to the platform.

In some examples of the magnetic actuator, the magnet assembly can include a plurality of magnets stacked on each other and attached together, wherein adjacent magnets of the stack are arranged such that north and south poles of the adjacent magnets are positioned in an alternating manner.

In some examples of the magnetic actuator, the magnet assembly can be attachable to an optical device and disposable within a coil actuator assembly.

In one example of the present disclosure there is provided a method of manufacturing a magnetic actuator. The method can include configuring a first magnet having a first magnetic axis and a first magnetic field and configuring a second magnet having a second magnetic axis and a second magnetic field. The method can include positioning the first magnet relative to the second magnet to angularly offset the respective magnetic axes and to define, at least in part, a magnetic assembly. Thus, the first and second magnetic fields collectively approximate a curve, such that the magnetic assembly effectively comprises an approximated curved magnetic field. The method can include locating the magnetic assembly within a coil actuator assembly.

In some examples of the method of manufacturing a magnetic actuator, the method can further comprise configuring the first and second magnets with a wedge-shape design, the magnets combining to provide the magnet assembly with an approximated curved configuration.

In some examples of the method of manufacturing a magnetic actuator, the method can further comprise configuring the first and second magnets with opposing curved surfaces, such that the magnet assembly comprises opposing curved surfaces.

In some examples of the method of manufacturing a magnetic actuator, the method can further comprise securing an attachment pole piece to an end of the magnetic assembly. The pole piece can comprise at least two alignment components interfaced to at least one of first and second support surfaces of a platform. The at least two alignment components can be arranged to facilitate self-alignment of the mount device relative to the platform prior to curing of an adhesive. The at least two alignment components and the adhesive can collectively restrict movement of the mount device relative to the platform.

In some examples of the method of manufacturing a magnetic actuator, the method can further comprise configuring a plurality of magnets to be stacked on one another to form the magnet assembly, wherein north and south poles of adjacent magnets are arranged in an alternating manner.

In some examples of the method of manufacturing a magnetic actuator, the method can include generating an approximated curved magnetic field by activating the coil actuator assembly.

In some examples of the method of manufacturing a magnetic actuator, the method can further comprise configuring the coil actuator assembly to comprise a housing having an opening (e.g., a circular cross-section opening or a rectangular cross-section opening) through which the magnet assembly is located.

In some examples of the method of manufacturing a magnetic actuator, the method can further comprise configuring each of the first and second magnets with an outer surface height dimension greater than an inner surface height dimension.

In some examples of the method of manufacturing a magnetic actuator, the method can further comprise configuring the first and second magnets to comprise opposing curved surfaces that combine to provide the magnet assembly with opposing surfaces having a curved configuration.

In some examples of the method of manufacturing a magnetic actuator, the method can further comprise configuring a plurality of magnets each having a magnetic axis and a magnetic field, the plurality of magnets stacking to at least partially form the magnetic assembly, wherein at least some of the magnetic axes are angularly offset from one another.

In some examples of the method of manufacturing a magnetic actuator, the method can further comprise attaching the magnet assembly to an optical device and attaching the coil actuator assembly to a support base of a fast steering mirror assembly, or vice versa.

In one example of the present disclosure there is provided a tilt platform assembly. The tilt platform assembly can include a support base and a tilt platform pivotally coupled to the support base. The assembly can include at least one coil actuator assembly mounted to one of the support base or the tilt platform, and at least one magnet assembly mounted to the other of the support base or tilt platform. The at least one magnet assembly can be disposable within the at least one coil actuator assembly. The at least one magnetic assembly can comprise at least two magnets having respective magnetic fields angularly offset from one another and that collectively approximate a curve, the magnetic assembly effectively exhibiting an approximated curved magnetic field (not a truly curved magnetic field, but one that approximates a curve due to the positioning of the magnets relative to one another and the resulting angularly offset magnetic axes).

In some examples of the tilt platform assembly, each of the at least two magnets has a magnetic axis about their north and south poles, and wherein at least some of the magnetic axes are angularly offset from one another.

In some examples of the tilt platform assembly, each of the at least two magnets has a wedge-shape design and combine to approximate a curve in the magnet assembly.

In some examples of the tilt platform assembly, the at least two magnets have an outer surface height dimension greater than an inner surface height dimension.

In some examples of the tilt platform assembly, the inner surface height dimensions of the at least two magnets are arranged adjacent each other to form a nonlinear magnet assembly.

In some examples of the tilt platform assembly, the at least two magnets comprise opposing curved surfaces that combine to provide the magnet assembly with opposing curved surfaces.

In some examples of the tilt platform assembly, the at least two magnets comprise five magnets each having a magnetic axis. The five magnets can be secured to each other in a stack wherein at least some of the magnetic axes are angularly offset from one another.

In some examples of the tilt platform assembly, the magnet assembly further comprises an attachment pole piece secured to an end of the at least two magnets.

In some examples of the tilt platform assembly, the platform includes a first support surface and an adjacent second support surface. The attachment pole piece can include at least two alignment components interfaced to at least one of the first and second support surfaces. The at least two alignment components can be arranged to facilitate self-alignment of the mount device relative to the platform prior to curing of an adhesive between the platform and the attachment pole piece. The at least two alignment components and the adhesive can collectively restrict movement of the mount device relative to the platform.

In some examples of the tilt platform assembly, the assembly comprises four magnetic assemblies each attached approximately to corner areas of the tilt platform. Four coil actuator assemblies can be attached to the support base and positioned to receive and actuate a corresponding magnet assembly to pivot the tilt platform.

In some examples of the tilt platform assembly, the at least one coil actuator assembly includes a housing having an opening (e.g., a circular cross-section opening or a rectangular cross section opening) through which the magnetic assembly is at least partially disposed.

In some examples of the tilt platform assembly, the housing has a central axis that is non-perpendicular to a planar operating side of the tilt platform.

In some examples of the tilt platform assembly, the magnet assembly includes a plurality of magnets stacked on each other and attached together, wherein magnets of the stack are arranged such that north and south poles of adjacent magnets are positioned in an alternating manner.

In some examples of the tilt platform assembly, the tilt platform is a mirror or other optical device.

In some examples of the tilt platform assembly, the assembly is at least part of a fast steering mirror assembly.

In one example of the present disclosure there is provided a method of facilitating pivot of a tilt platform assembly. The method can include providing a tilt platform assembly having a support base, a tilt platform pivotally coupled to the support base, and at least one coil actuator assembly mounted to one of the support base or the tilt platform. The assembly can include at least one magnetic assembly mounted to the other of the support base or tilt platform, and being disposable within the at least one coil actuator assembly. The at least one magnetic assembly can comprise at least two magnets having respective magnetic fields. The method can include approximating a curved magnetic field by positioning the at least two magnets adjacent each other, and facilitating actuation of the at least one magnet assembly to pivot the tilt platform relative to the mount plate.

In some examples of the method of facilitating pivot of a tilt platform assembly, the step of approximating the curved magnetic field can further comprise configuring a first magnet having a first magnetic axis; configuring a second magnet having a second magnetic axis; and positioning the first magnet relative to the second magnet to angularly offset the respective magnetic axes and to define, at least in part, the magnetic assembly.

In some examples of the method of facilitating pivot of a tilt platform assembly, each of the at least two magnets comprises a magnetic axis about the north and south poles, and wherein at least some of the magnetic axes are angularly offset from one another.

In some examples of the method of facilitating pivot of a tilt platform assembly, each of the at least two magnets comprise a wedge-shape design that combine to approximate a curve in the magnetic assembly.

In some examples of the method of facilitating pivot of a tilt platform assembly, the at least two magnets comprise opposing curved surfaces that combine to curve the magnetic assembly.

In some examples of the method of facilitating pivot of a tilt platform assembly, the at least two magnets comprise five magnets each having a magnetic axis, the magnets secured to each other in a stack wherein at least some of the magnetic axes are angularly offset from one another.

In some examples of the method of facilitating pivot of a tilt platform assembly, the method can further include coupling an attachment pole piece to one end of the at least two magnets.

In some examples of the method of facilitating pivot of a tilt platform assembly, the method can further comprise positioning the attachment pole piece against the tilt platform and adhering the attachment pole piece to the tilt platform. The tilt platform can include a first support surface and an adjacent second support surface. The attachment pole piece comprises at least two alignment components interfaced to at least one of the first and second support surfaces, and the at least two alignment components can be arranged to facilitate self-alignment of the mount device relative to the platform prior to curing of the adhesive. The at least two alignment components and the adhesive can collectively restrict movement of the mount device relative to the platform.

In some examples of the method of facilitating pivot of a tilt platform assembly, the method can further comprise disposing adhesive between the attachment pole piece and the tilt platform, and positioning the attachment pole piece against the tilt platform to allow self-alignment of the at least two alignment components before the adhesive cures. The method can include allowing the adhesive to cure to secure the pole piece and the magnetic assembly to the tilt platform.

In some examples of the method of facilitating pivot of a tilt platform assembly, the method can further comprise attaching four magnetic assemblies approximately to corner areas of the tilt platform, and then attaching four coil actuator assemblies to the support base to receive and actuate respective magnetic assemblies to pivot the tilt platform.

In some examples of the method of facilitating pivot of a tilt platform assembly, the method can further comprise attaching a plurality of magnets stacked on each other to form the magnetic assembly, wherein north and south poles of adjacent magnets are positioned in an alternating manner.

In some examples of the method of facilitating pivot of a tilt platform assembly, the method can further comprise generating an approximated curved magnetic field by activating the coil actuator assembly.

In some examples of the method of facilitating pivot of a tilt platform assembly, the method can further comprise generating an approximated curved magnetic field about each of the four magnet assemblies by activating at least some of the four coil actuator assemblies to pivot the tilt platform about the support base.

In one example of the present disclosure there is provided a mounting system for an optical device. The system can include an optical device comprising an operating side and a mounting side, and the mounting side can have a first support surface and an adjacent second support surface. The system can include an external member and a mount device fixedly coupled to the mounting side of the optical device via an adhesive and securable to the external member. The mount device can comprise at least two alignment components interfaced to at least one of the first and second support surfaces. The at least two alignment components can be arranged to facilitate self-alignment of the mount device relative to the optical device prior to curing of the adhesive. The at least two alignment components and the adhesive can collectively restrict movement of the mount device relative to the optical device.

In some examples of the mounting system, one of the at least two alignment components comprises a first point of contact and a second point of contact, where each of the first and second points of contact are interfaced to the first support surface. Another one of the at least two alignment components can comprise a third point of contact interfaced to the second interface surface, wherein the first, second, and third points of contact assist to self-align the mount device relative to the optical device.

In some examples of the mounting system, the one of the at least two alignment components can comprise a planar surface on which the first and second points of contact are positioned of located. The other one of the at least two alignment components can comprise a curved surface on which the third point of contact is positioned or located.

In some examples of the mounting system, the adhesive is disposed between a planar surface of the mount device and a recess on the mounting side of the optical device.

In some examples of the mounting system, the first support surface and the second support surface can each be substantially perpendicular to a plane of the operating side.

In some examples of the mounting system, the optical device can be either static or kinematic.

In some examples of the mounting system, the external member comprises at least one of a structural support member, an actuation member, or a magnetic actuator component.

In some examples of the mounting system, the external member comprises a magnetic assembly and the mount device comprises a pole piece of the magnetic assembly.

In some examples, a fast steering mirror mounting system comprises a plurality of mount devices attached to respective pluralities of the first and second support surfaces of the optical device on the mounting side.

In some examples of the mounting system, the mounting system can be devoid of fasteners that are capable of exerting stresses on the optical device.

In one example of the present disclosure there is disclosed a method of mounting an optical device. The method can comprise forming an optical device comprising an operating side and a mounting side. The mounting side can have a first support surface and an adjacent second support surface. The method can include securing a mount device of an external member to the mounting side of the optical device. The mount device can comprise at least two alignment components interfaced to at least one of the first and second support surfaces. The at least two alignment components can be arranged to facilitate self-alignment of the mount device relative to the optical device prior to curing of an adhesive. The at least two alignment components and the adhesive can collectively restrict movement of the mount device relative to the optical device.

In some examples of the method of mounting the optical device, the securing step further comprises disposing adhesive between the mount device and the optical device, and, while the adhesive is in a liquid state, aligning the at least two alignment components in position relative to respective first and second support surfaces. The adhesive can then be caused to cure.

In some examples of the method of mounting the optical device, the method can further comprise configuring one of the at least two alignment components with a first point of contact and a second point of contact. Each of the first and second points of contact can be interfaced to the first support surface. The method can further comprise configuring the other one of the at least two alignment components with a third point of contact that can be interfaced to the second interface surface, such that the first, second, and third points of contact self-align the mount device relative to the optical device.

In some examples of the method of mounting the optical device, the forming the optical device can comprise forming a pedestal having a recess. The pedestal can be adjacent to the mount device and the recess can define an area to receive the adhesive.

In some examples of the method of mounting the optical device, the method can further comprise configuring the one of the at least two alignment components with a planar surface on which the first and second points of contact are located, and configuring the other one of the at least two alignment components with a curved surface on which the third point of contact is located.

In some examples of the method of mounting the optical device, the method can further comprise statically or kinematically mounting the optical device to a support base about the external member.

In some examples of the method of mounting the optical device, the method can further comprise at least partially disposing the external member proximate a coil actuator assembly, the external member comprising at least one magnet.

In some examples of the method of mounting the optical device, the external member can comprise a magnetic assembly comprising at least two magnets, and wherein the mount device is a pole piece attached to one of the magnets.

In some examples of the method of mounting the optical device, the at least two magnets can have respective magnetic fields that collectively approximate a curve.

In some examples of the method of mounting the optical device, the method can further comprise forming a plurality of first and second support surfaces, and securing a plurality of mount devices to respective support surfaces of the optical device on the mounting side.

In some examples of the method of mounting the optical device, the mounting method can result in an optical device mounting system that is devoid of fasteners capable of exerting stresses on the optical device.

With reference to FIGS. 1-4, shown is a tilt platform assembly 100 in accordance with an example of the present disclosure. In this example, the tilt platform assembly 100 comprises a fast steering mirror assembly mountable to a structure via three mounts 101 (such as for being mountable to a telescope, satellite, aircraft, or other suitable structure). FIG. 1 shows the fully assembled tilt platform assembly 100, and FIG. 2A shows a cross section of FIG. 1 about line 2A-2A. The tilt platform assembly 100 can include a support base 102 and a tilt platform 104 pivotally coupled to the support base 102 by a flexure device 106 positioned between the support base 102 and the platform 104 (flexure device 106 is shown generically in FIGS. 2A, 2B, and 3; flexure devices coupled between a mirror and a base and that facilitate pivot are known in the art and will not be shown and discussed in detail). The assembly 100 can include at least one coil actuator assembly 108a-d (see also FIGS. 2A-4) mounted to the support base 102 by a plurality of fasteners 110. Four magnetic assemblies 112a-d (see FIGS. 2A-3) can be mounted to the tilt platform 104 and can be disposed within a respective coil actuator assembly 108a-d. Each magnetic assembly 112a-d can comprise a plurality of magnets 118a-f having respective magnetic fields that collectively approximate a curved magnetic field (see the discussion below regarding FIGS. 5A and 5B). Regarding FIGS. 1-4 there is provided an example of four magnetic assemblies 112a-d each disposed at least partially within a respective coil actuator assembly 108a-d. Those skilled in the art will recognize that, in an inverse arrangement, the coil actuator assemblies can be mounted to the tilt platform while the magnetic assemblies can be mounted to the support base, such that the coil actuator assemblies move relative to the magnetic assemblies.

Coil actuator assembly 108a, for instance, includes a housing 114 (typically aluminum) and a copper coil 116 wrapped around the housing 114 (see FIGS. 2A and 2B). The copper coil 116 can be electrically coupled to a power source (not shown), such that supplying a controlled voltage to one or more of the copper coils 116 causes actuation of one or more respective magnetic assemblies 112a-d, thereby facilitating a desired pivot of the tilt platform 104 relative to the support base 102 (see FIG. 2B for an example of the platform 104 tilted toward the right relative to the support base 102 due to actuation of the magnetic assemblies). As will be discussed further regarding FIGS. 5A-6C, because each magnetic assembly 112a-d is arranged in a curved configuration, each magnetic assembly has optimized clearance to move within its respective housing of its coil assembly 108a-d as compared to a magnetic assembly that is substantially straight or linear. This maximized or optimized clearance provides a more compact assembly as compared to the clearance provided by a straight magnetic assembly disposed in a similar coil assembly, all while pivoting the platform within a desired range of movement (e.g., +/−8 degrees in Ry and +/−3 degrees in Rx axes; see FIG. 1). Indeed, the ratio of length L to depth D (FIG. 1) can be increased to provide a more compact, low-profile design over prior designs having a straight magnetic assembly. For example, a mirror having dimensions of 2.7 inches by 4.0 inches can be included within a tilt platform assembly 100 as shown in FIGS. 1-4 having a length L of 5.5 inches and a depth D of 1.5 inches. In other words, the ratio of depth to length of this fast steering mirror assembly can be at least a 1:3.66, while providing a pivotal range of +/−8 degrees in Ry and +/−3 degrees in Rx axes.

Figure 5A:
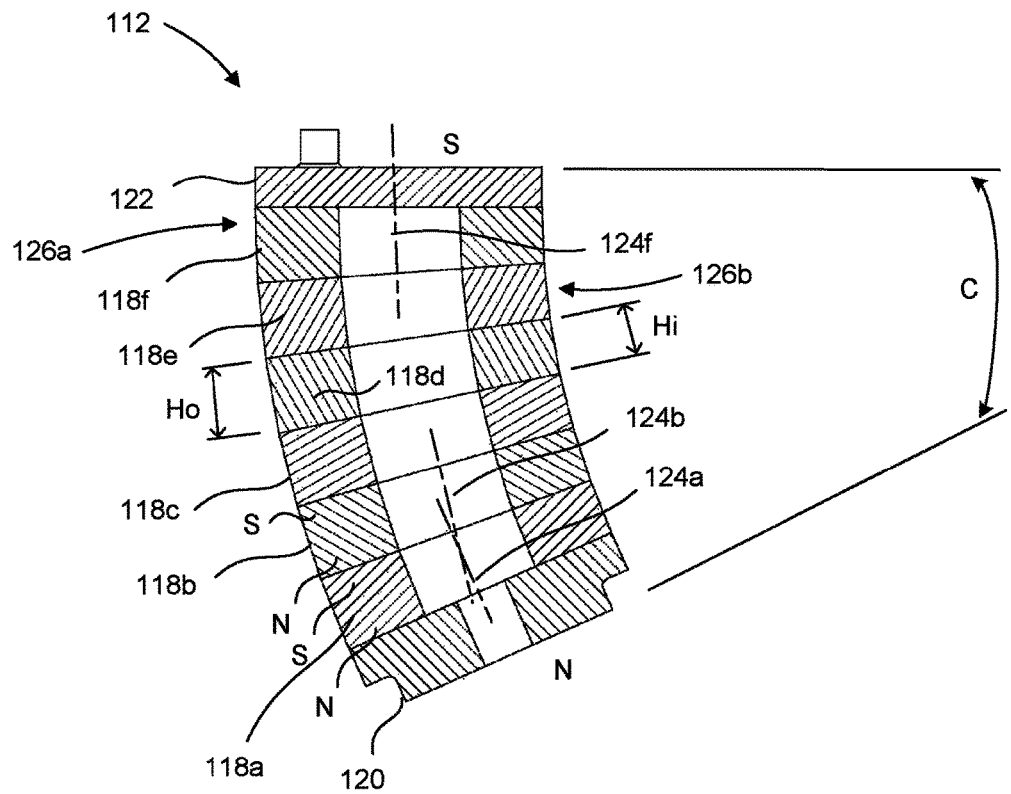
FIG. 5A shows a cross sectional view of one of the magnetic assemblies of the pivot tilt assembly of the fast steering mirror as shown in FIG. 2A.

FIG. 5A shows a magnetic assembly 112 having a plurality of magnets 118a-f stacked on each other and having an end pole piece 120 and an attachment pole piece 122 attached at either end of the stack of magnets 118a-f. The pole pieces 120 and 122 are typically comprised of stainless steel that assist to complete a magnetic field about the stack of magnets. Each magnet 118a-f comprises a magnetic axis 124a-f about their north pole N and south pole S (for clarity, only the magnetic axes 124a, 124b, and 124f are shown). In some examples, at least some of the magnetic axes 124a-f are angularly offset from one another. For example, FIG. 5A shows that all the magnetic axes 124a-f are angularly offset from one another, as illustrated by axis 124a being angularly offset from axis 124b of adjacent magnets. In this example, each magnet 118a-f comprises a wedge-shape design having an outer surface height dimension $H_o$ greater than an inner surface height dimension $H_i$ (see magnet 118d). In other words, the magnets 118a-f can comprise a tapered or tapering cross-section, as shown. In some examples, the magnetic assembly can comprise opposing curved surfaces 126a and 126b, wherein the individual magnets 118a-f comprise opposing curved outer surfaces that combine to curve the magnet assembly 112. In other examples, the magnetic assembly 112 can have a varying configuration, such as a curved section followed by a straight section followed by another curved section, the overall configuration of the magnet assembly 112 being based upon or defined by the individual magnets 118.

The magnets 118a-f can be adhered together and arranged as shown such that their north and south poles alternate relative to adjacent magnets, as illustrated by the N and S labels on magnets 118a and 118b. Thus, a north pole N will exist at pole piece 120, and a south pole S will exist at pole piece 122. Of course, each magnet 118a-f will inherently have a magnetic field, and the magnetic fields of adjacent magnets in the stack will be slightly offset from each other due to at least some (or all) of the magnetic axes being angularly offset from each other. Thus, arranging the magnets 118a-f in this manner such that the magnetic axes are angularly offset from or relative to one another will cause the resulting magnetic fields generated by the magnets 118 within the magnetic assembly 112 to also be offset from or relative to one another, wherein the magnetic fields collectively and effectively operate to "approximate" a curve. Stated differently, the collective magnetic fields operate to approximate a curve, such that the magnetic assembly can be said to comprise a magnetic field that approximates a curve. Of course, due to the laws of physics a magnetic field of a single magnet cannot be "bent" or "curved". Therefore, by arranging a stack of magnets in this curved configuration, a curved magnetic field is approximated. Using this magnetic assembly configuration, a coil assembly can appropriately actuate the magnetic assembly with predictable results. This "approximated curved magnetic field" generated by the curved magnetic assembly is highly advantageous when the magnetic assembly 112 is used in conjunction with a compact coil actuator assembly, as further discussed below.

Figure 5B:
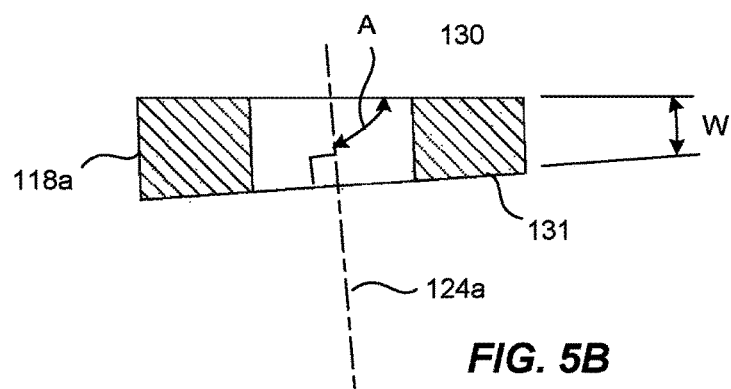
FIG. 5B shows a cross sectional view of a single magnet of the magnetic assembly shown in FIG. 5A.

In one example, as illustrated in FIG. 5B, each magnet (e.g., magnet 118a) can have a wedge shape with an angle W. In the specific example of FIG. 5B, the magnet 118a can comprise a wedge of approximately 8 degrees as measured between a planar surface 130 and an angled surface 131.

Accordingly, magnet 118a has an axis angle A of approximately 94 degrees between the central axis 124a and the planar surface 130 of the magnet if the axis 124a is oriented normal to the angled surface 131, as shown. Thus, as shown on FIG. 5A, a collective angle C can be approximately 24 degrees between opposing end surfaces of the magnetic assembly 112. Of course, the collective angle C can vary depending on the axis angle A of each magnet in the stack. In the most simplified example, a pair of wedge-shaped magnets could be stacked on each other to approximate a curved magnetic field for an actuator; however, three or more magnets is desirable for optimal performance of travel and actuation by a coil actuator assembly.

The aforementioned angles and other properties of the magnetic assembly 112 (e.g., strength, number, size of magnets, configuration of magnets, force and torque required by each actuator) can be determined and optimized by a computer program with other factors of other components of the magnetic actuator assembly, such as various features of the coil assembly components. For example, a particular flexure of a fast steering mirror can have a known stiffness that the magnetic actuators must overcome to actuate the mirror and to achieve a desired mirror pivot travel. Based on these known quantities, a curved magnetic actuator assembly can be designed having a particular required torque to overcome said known factors. For instance, these known quantities can be inputted by a designer using MAXWELL® software, for example, to receive a computer generated output providing the force required to actuate the mirror. Specifically, a designer can input the current (e.g., 100 Amps), the actuator radius (e.g., 1.25 inches), the number of actuators (e.g., 4) and other known parameters that the software program can then use to calculate or determine the force needed to pivot the particular mirror about the particular flexure. Based on this output, the predictive resistance of the magnetic assembly can be determined, as well as the force and torque per amp, and the resistance, acceleration, acceleration with the flexure, and the torque of the actuators as compared to the stiffness of the flexure. In the design process, at least one pole piece can be disposed within the coil assembly for optimal performance. Such general design determinations are known with straight magnetic assemblies. However, in the present disclosure the housings of the coil actuator assemblies can be designed at a non-perpendicular angle relative to the operating side of the mirror, and the magnetic assemblies can be designed to be curved relative to the coil actuator assembly (e.g., FIG. 2A). Because of such configuration (as further discussed herein), the coil assemblies can be more compact in size as compared to straight (e.g., vertical) coil assemblies having straight magnets therein.

With reference to FIG. 6A, a schematic is provided to illustrate the geometric clearances when incorporating a prior related straight magnet 200 into a prior related straight coil actuator assembly 202 to pivot a tilt platform (not shown). "Straight" is intended to mean a magnet or magnet assembly having an axis that is not curved or, in the case of a collection of magnets making up in part a magnet assembly, that does not approximate a curve. In this illustration, the straight magnet 200 has the same or similar width as that of the curved magnetic assembly 208 of FIG. 6B. As shown in FIG. 6A, when the straight magnet 200 is actuated upwardly by a coil assembly 202 (a coil assembly having a same housing size and shape as the coil assembly of FIG. 2A and FIG. 6B (but having a bobbin perpendicular to a mirror surface when in a neutral position)), a lower corner area 204 of the straight magnet 200 will contact a left side wall 206 of the housing of the coil assembly 202. Such "contact" is not desirable and would render an accompanying tilt platform or actuator inoperable or would limit that travel of the tilt platform, thus resulting in less than optimal performance. Thus, a coil actuator assembly housing having a larger cross sectional area would be required to facilitate the same pivot angle and magnetic actuation of the travel of the assembly of FIG. 6B, thereby requiring a larger actuation assembly, which can increase the cost and size of a fast steering mirror, for instance. With further comparison to FIG. 6B, the system shown as having the same sized and shaped coil actuator assembly housing as that illustrated on FIG. 6A, the curved magnetic assembly 208 of the present disclosure can travel or traverse a greater distance within its coil assembly 210 as compared to the straight magnetic assembly 200 of FIG. 6A due to the presence of the curved shape of the magnetic assembly 208. As shown, a lower corner area 212 is clear of (or separated from) a left side wall 214 of the coil assembly 210 of FIG. 6B upon the magnetic assembly 208 traveling the same distance as the magnet 200 of FIG. 6A, thus permitting or facilitating further travel by the magnetic assembly 208 of FIG. 6B over that of magnet 200, or a reduction in size of the coil actuator assembly 210. In other words, a smaller or minimized sized housing can be incorporated with the curved magnetic assembly 208 as compared to a straight magnet in order to achieve the same desired pivot angle and magnetic actuation travel.

In another example, FIG. 6O shows a magnetic actuator assembly 216 having coil assembly 218 with a curved cross sectional shape that corresponds to a curved shape of the curved magnetic assembly 216. As shown, a lower corner area 222 is clear of (or separated from) a left side wall 224 of the coil assembly 210, which is a greater distance of separation as compared to that shown in FIG. 6B. This configuration provides even greater geometric clearances between the magnetic assembly and the housing of the coil assembly, thereby providing an even more minimized or optimized compact magnetic actuator to that of FIG. 6A or 6B.

Figure 7A:
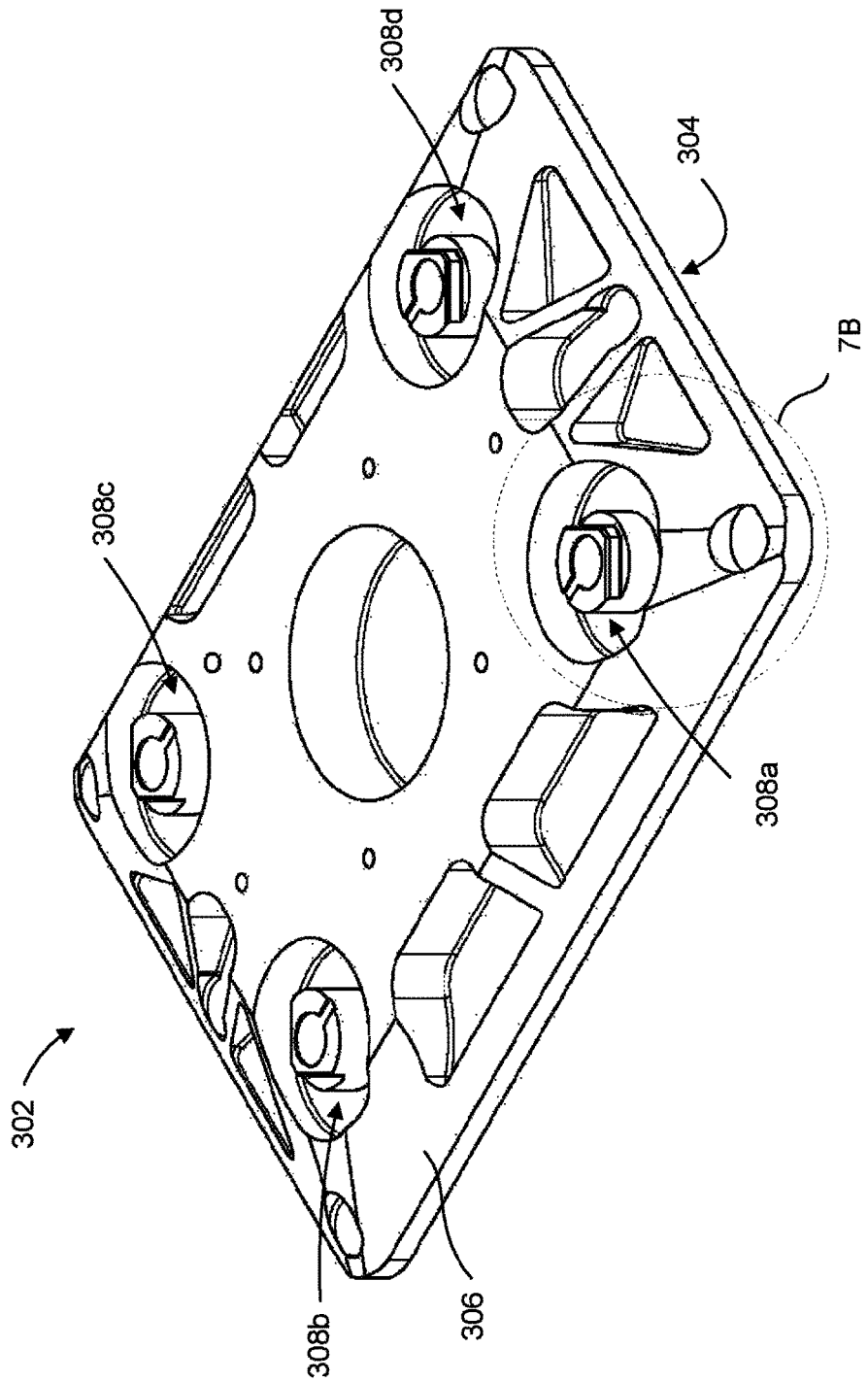
FIG. 7A shows an isometric view of a platform of a tilt platform assembly, such as that shown in FIG. 2A, in accordance with an example of the present disclosure.

With reference to FIGS. 7A-9, a self-aligning mounting system 300 is disclosed (see specifically the mounting system shown in FIG. 9). FIG. 7A shows a platform 302, which may be an optical device, such as a mirror or lens (or other component that is comprised of sensitive material such that stresses exerted on the platform may cause failure or poor performance of the platform). As generally known, a mirror of a fast steering mirror assembly (e.g., FIG. 1) can be entirely formed of Beryllium, which is quite sensitive to clamping forces and other stresses exerted by mechanical fasteners such as screws, bolts, etc., for example. Such forces can cause distortion of the reflecting surface or operating side of the mirror, for example, which leads to poor performance such as "fuzzy" or blurred or distorted images transmitted by the mirror. In addition, when mounting one or more external members to the optical device (in order to mount the optical device statically or kinematically), it can be important to precisely mount said external component to the optical device to restrict movement between the external member and the optical device and to properly align the optical device relative to another mirror and/or relative to the mirror's mounting structure, for instance. This is primarily because even the smallest tolerances can compound along the mounting system and can dramatically affect the performance of the optical device, particularly with a kinematic-type mounting system of an optical device. Therefore, the mounting system 300 disclosed herein provides a self-aligning mounting system that minimizes or substantially reduces stresses on the optical device as compared to systems that require mechanical fasteners (or that require additional and/or complex mounting components).

In one example, the platform 302 can be formed as a uniform body (e.g., entirely of Beryllium) having an operating side 304 (e.g., a reflective side, such as that shown in FIGS. 1-2B) and a mounting side 306 (the side shown in FIG. 7A). The mounting side 306 can include four pedestals 308a-d (see also elements 108a-d in FIG. 3). With specific reference to the cutout of FIG. 7B (although also applicable to all other pedestals), the pedestal 308a can be raised vertically from a recessed area 310 formed in the mounting side 306. The pedestal 308a can comprise a first support surface 312a and an adjacent second support surface 312b, which may be formed such that they are oriented transverse (e.g., orthogonal at 90 degrees) relative to each other (or oriented on another angle between approximately 30-130 degrees).

As shown in FIG. 8, a mount device 314 can be secured (e.g., adhered using adhesives) to an end magnet of a magnetic assembly 318 (alternatively, the mount device 314 can be coupled to any other external member of an optical device assembly, such as a static support member, actuator rod/member, or other magnetic actuator). The mount device 314 can be configured to self-align and be secured to the mounting side 306 of the platform 302. More specifically, the mount device 314 (e.g., a pole piece of the magnetic assembly) can include a planar adhesive surface 322. Extending a distance from the adhesive surface 322 can be a primary alignment component 324a and a secondary alignment component 324b located or positioned proximate one another in a particular or specific strategic configuration corresponding to the first and second support surfaces 312a and 312b (components 324a-b also shown in FIG. 9). The alignment components 324a and 324b can extend approximately the same distance or height from the adhesive surface 322, or they can extend different distances depending upon the configuration of the mounting system 300. In the example shown, the primary alignment component 324a can comprise a triangular shaped protrusion having a planar surface 326 that defines a first point of contact 328a and a second point of contact 328b (although other protrusion shapes such as a rectangle or polygon can be used). The secondary alignment component 324b can be a cylindrical pin having a curved surface that defines a third point of contact 328c. With continued reference to the pedestal 308a, and as shown in FIG. 7B, an upper planar surface 332 and a recess 334 formed therein can be provided on an upper area of the pedestal 308. The upper planar surface 332 may be substantially planar with and parallel to the operating side 304 of the platform 302, and the first and second support surfaces 312a and 312b may be substantially perpendicular to the upper planar surface 332 of the pedestal 308a and the operating side 304 of the platform 302. The recess 334 can be sized to receive an adhesive 336 (also shown in FIG. 8) to permanently secure the pedestal 308a to the adhesive surface 322 of the mount device 314 (see FIGS. 7B and 8 for circular "bubbles" that illustrate the adhesive regions on each component when the mount device is adhered to the pedestal, and as shown adhered together in FIG. 9).

During a mounting and self-aligning process, the adhesive surface 322 of the mount device 314 is biased against the upper planar surface 332 of the pedestal 308. The adhesive 336 is disposed between the recess 334 and the adhesive surface 322 to adhere the adhesive surface 322 to the recess 334 of the pedestal 308a. While the adhesive 336 is in a liquid or uncured state in the recess 334, the mount device 314 can be clocked or self-aligned against the pedestal 308a and the adhesive 336 allowed to cure. Specifically regarding said self-alignment, while the adhesive 336 is in the liquid state, the primary alignment component 324a can be engaged or interfaced with and biased against the first support surface 312a such that the first point of contact 328a and the second point of contact 328b interface and engage with the first support surface 312a. Concurrently or separately (and while the adhesive is still liquid and uncured), the secondary alignment component 324b can be engaged or interfaced with and biased against the second support surface 312b of the pedestal 308a, such that the third point of contact 328c interfaces or engages with the second support surface 312b. Once all three points of contact are engaged with their respective surfaces, the adhesive can be allowed to cure, thereby permanently securing the magnetic assembly (or other external member) to the platform 302 in a highly accurate and self-aligned manner. Of course, the exact location of a particular point of contact may slightly vary; however, the crux of the self-alignment configuration is that three points of contact exist between the mount device 314 and the pedestal 308a.

This self-aligning method can also provide a very repeatable and highly accurate mounting system between the platform 302 and an external member or magnetic actuator. Specifically, because the first and second points of contact 328a-b are positioned about a single planar surface, the primary alignment component 324a can be machined with highly accurate precision and can be planarly biased against the first support surface 312a, thereby guaranteeing two points of contact to assist with self-alignment of the mount device 314 relative to the platform 302. Similarly, because the third point of contact 328c is positioned about a curved surface, the secondary alignment component 324b can be biased against the second support surface 312b about only a single point of contact and without other components or points of contact against the second support surface 312b. As arranged, the primary and secondary alignment components 324a and 324b cooperatively and simultaneously provide three points of contact to interface with the platform to self-align or clock the mount device to the platform with minimized tolerances (as compared to two or four points of contact, or a system of mechanical fasteners). Providing only two points of contact (e.g., just two pins) can result undesirable tolerance issues because the mount device may tend to rotate about one of the pins during installation, and tolerance issues may further exist. Proving four points of contact is also possible (e.g., two identical primary portions adjacent each other), but there is a risk that one of the points of contact will not be interfaced with or seated properly against the pedestal because of tolerances issues when machining a pair of planar surfaces to interface with a pair of planar support surfaces, for example. Thus, as shown on FIG. 8, providing two protrusions (one being configured to provide an elongated planar interface surface, and the other configured to provide a curved interface surface) that define three points of contact (2 on the planar surface and one on the curved surface) can facilitate accurate and proper self-alignment (e.g., all points of contact properly interfaced and engaged with the pedestal), and can minimize undesirable tolerance issues that can lead to poor performance of the overall mounting system. Those skilled in the art will recognize other configurations that can accomplish a similar result. For example, the primary alignment component 324a can comprise a pair of parallel pins or protrusions, each defining a point of contact, that collectively define a plane against which to align and interface or engage the first support surface of the pedestal. However, because of machining tolerance issues, the primary portion 324a shown having a single planar surface may be preferable because of the aforementioned advantages.

Figure 10:
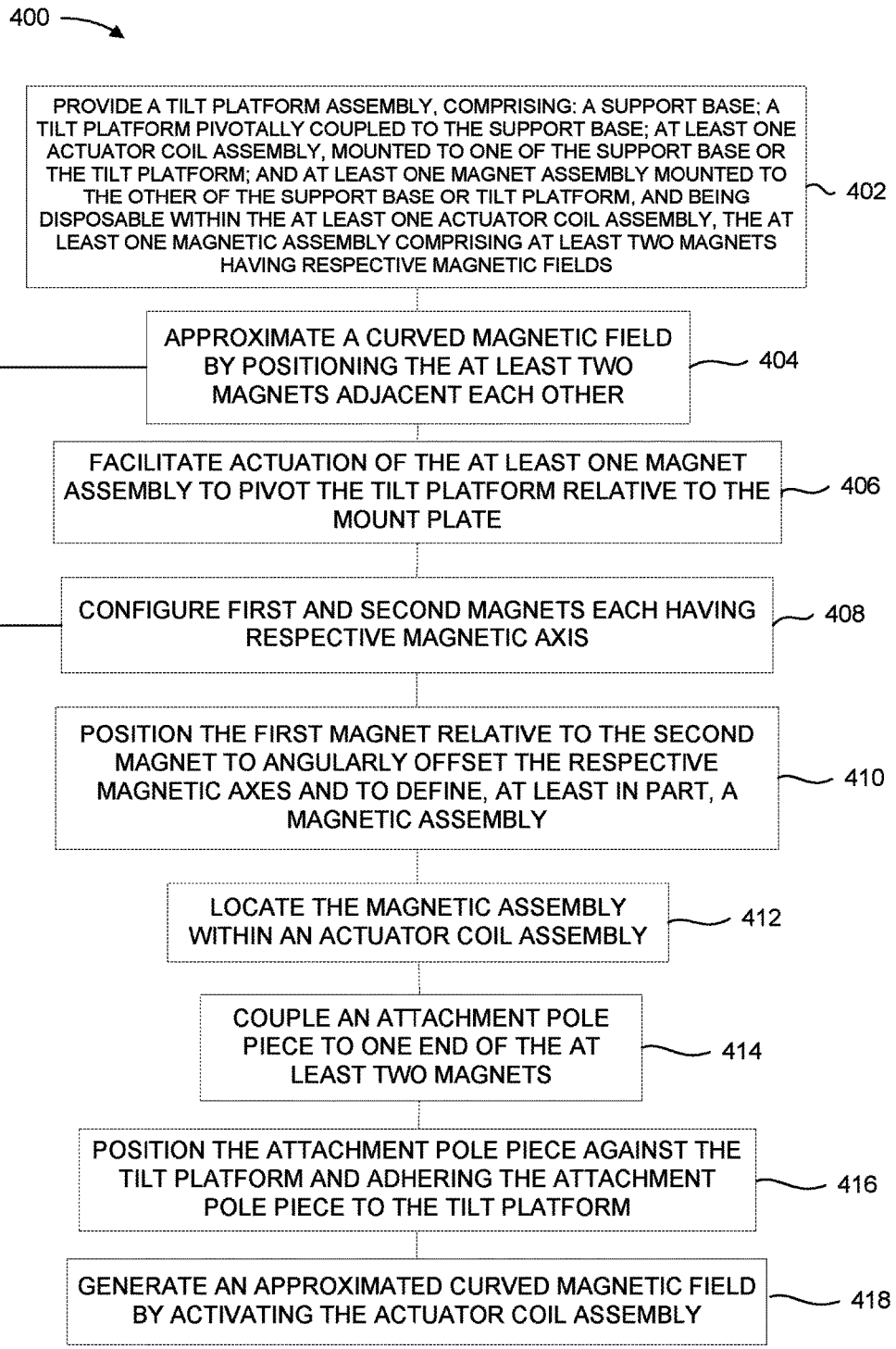
FIG. 10 is a flow diagram illustrating a method of making a tilt platform assembly, in accordance with an example of the present disclosure.

FIG. 10 illustrates a method 400 of facilitating pivot of a tilt platform assembly, such as described regarding the tilt platform assembly and related components and operations discussed with reference to FIGS. 1-5B. The method 400 can include step 402 of providing a tilt platform assembly having a support base, a tilt platform pivotally coupled to the support base, and at least one coil actuator assembly mounted to one of the support base or the tilt platform (e.g., as described regarding FIGS. 1-4). The assembly can include at least one magnetic assembly (e.g., 112a-d) mounted to the other of the support base or tilt platform, and being disposable within the at least one coil actuator assembly (e.g., 108a-d). The at least one magnetic assembly can comprise at least two magnets having respective magnetic fields, and angularly offset magnetic axes, such as discussed specifically regarding FIGS. 5A and 5B. The method 400 can include step 404 of approximating a curved magnetic field by positioning the at least two magnets adjacent each other, and step 406 of facilitating actuation of the at least one magnet assembly to pivot the tilt platform relative to the mount plate, as further discussed regarding FIGS. 1-5.

Step 404 of approximating the curved magnetic field can comprise step 408 of configuring first and second magnets each having a respective magnetic axis (e.g., as described regarding FIGS. 5A and 5B). Step 410 comprises positioning the first magnet relative to the second magnet to angularly offset the respective magnetic axes and to define, at least in part, a magnetic assembly (FIG. 5A). Such positioning can be achieved by adhering or otherwise securing the magnets to each other about corresponding planar surfaces of each magnet, as arranged in the example of FIG. 5A and discussed herein. Step 412 comprises locating the magnetic assembly within a coil actuator assembly, as shown and discussed regarding FIGS. 2A and 2B. Step 414 comprises coupling an attachment pole piece to one end of the at least two magnets (e.g., as described regarding FIGS. 5A, 8, and 9). The attachment pole piece can be adhered or otherwise secured to an end of a stack of magnets, such as shown on FIG. 5A. Step 416 comprises positioning (e.g., self-aligning) the attachment pole piece against the tilt platform and adhering the attachment pole piece to the tilt platform (e.g., as further described regarding FIGS. 7A-9). This can be achieved by a machine or person holding and positioning a magnetic assembly (having the pole piece) proximate a pedestal of the tilt platform (e.g., mirror), then biasing the pole piece against the pedestal, and then clocking or self-aligning the pole piece relative to the pedestal (as discussed regarding FIGS. 7-9), and then allowing deposited adhesive to cure and secure the pole piece to the pedestal. Step 418 comprises generating an approximated curved magnetic field by activating the coil actuator assembly, which is further described in the examples of FIGS. 1-9. The steps described regarding method 400 can be repeated or otherwise performed for a plurality of magnetic assemblies (e.g., 112a-d) secured to a platform of a tilt platform assembly having coil assemblies.

Figure 11:
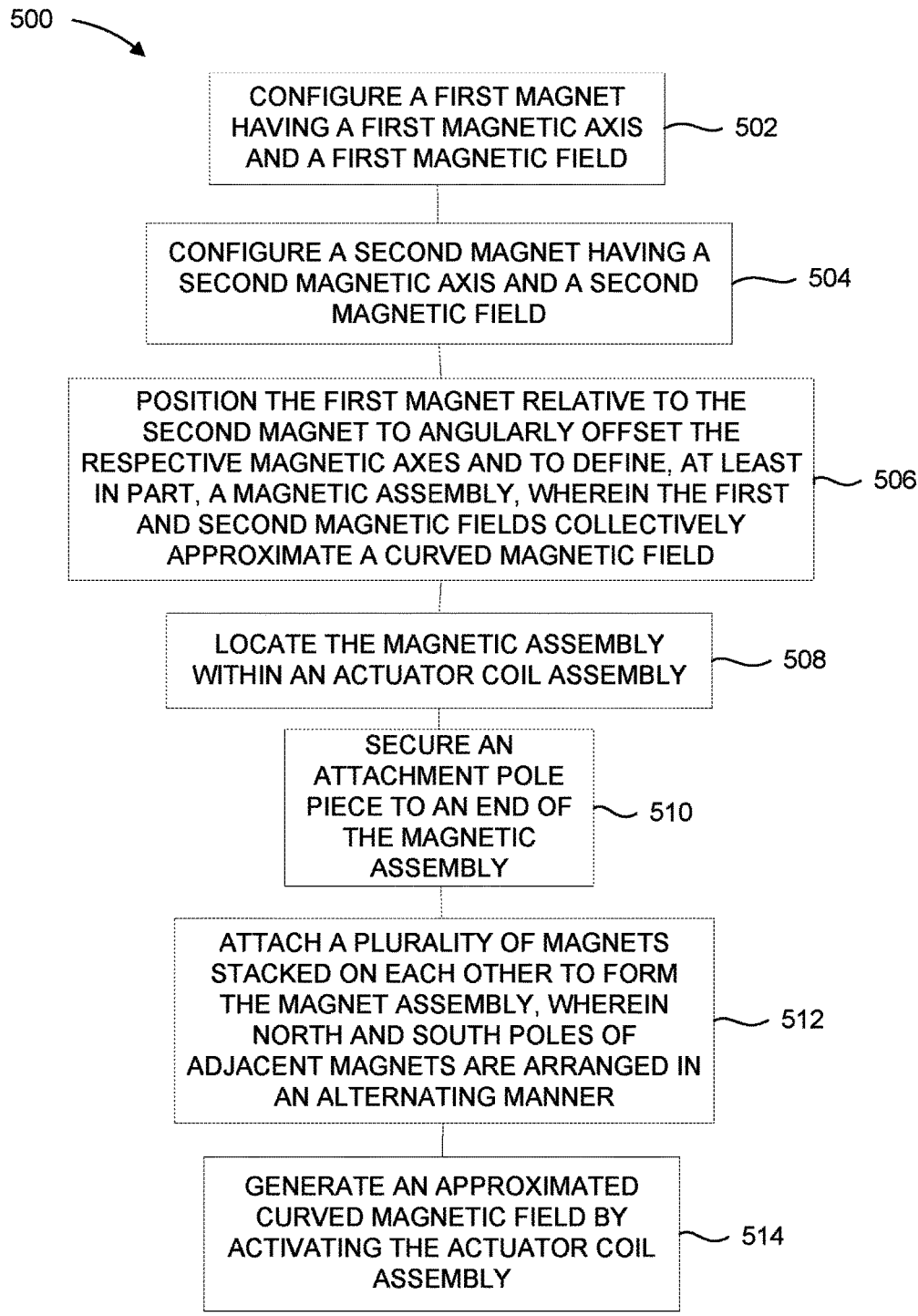
FIG. 11 is a flow chart illustrating a method of making a magnetic actuator, in accordance with an example of the present disclosure.

FIG. 11 illustrates a method 500 of manufacturing a magnetic actuator, such as described further regarding the operations and components discussed with reference to FIGS. 1-9, namely the actuators 108a-d. The method 500 can comprise step 502 of configuring a first magnet having a magnetic axis and a first magnetic field, and step 504 of configuring a second magnet having a magnetic axis and a second magnetic field (e.g., as described regarding FIGS. 5A and 5B). The method 500 comprises step 506 of positioning the first magnet relative to the second magnet to angularly offset the respective magnetic axes and to define, at least in part, a magnetic assembly (FIG. 5A). Such positioning can be achieved by adhering or otherwise securing the magnets to each other about corresponding planar surfaces of each magnet, as arranged in the example of FIG. 5A and discussed herein. Thus, the first and second magnetic fields operate together to collectively approximate a curve, as discussed in the examples of FIGS. 1-5B and 6B. The method 500 comprises step 508 of locating the magnetic assembly within a coil actuator assembly, as shown and discussed regarding FIGS. 2A and 2B. Step 510 comprises securing an attachment pole piece to an end of the magnetic assembly (e.g., as described regarding FIGS. 5A, 8, and 9). The attachment pole piece can be adhered or otherwise secured to an end of a stack of magnets, such as shown on FIG. 5A. Step 512 comprises attaching a plurality of magnets stacked on each other to form the magnet assembly, wherein north and south poles of adjacent magnets are arranged in an alternating manner. Such arrangement is further discussed regarding FIG. 5A. The magnets can be cut or sawed from straight magnet section, thereby forming a tapered shaped magnet, and then the magnets can be stacked and adhered together in an alternating north and south pole to form a curved magnetic assembly, as best shown on FIG. 5A. Step 514 comprises generating an approximated curved magnetic field by activating the coil actuator assembly which is further described in the examples of FIGS. 1-9.

Figure 12:
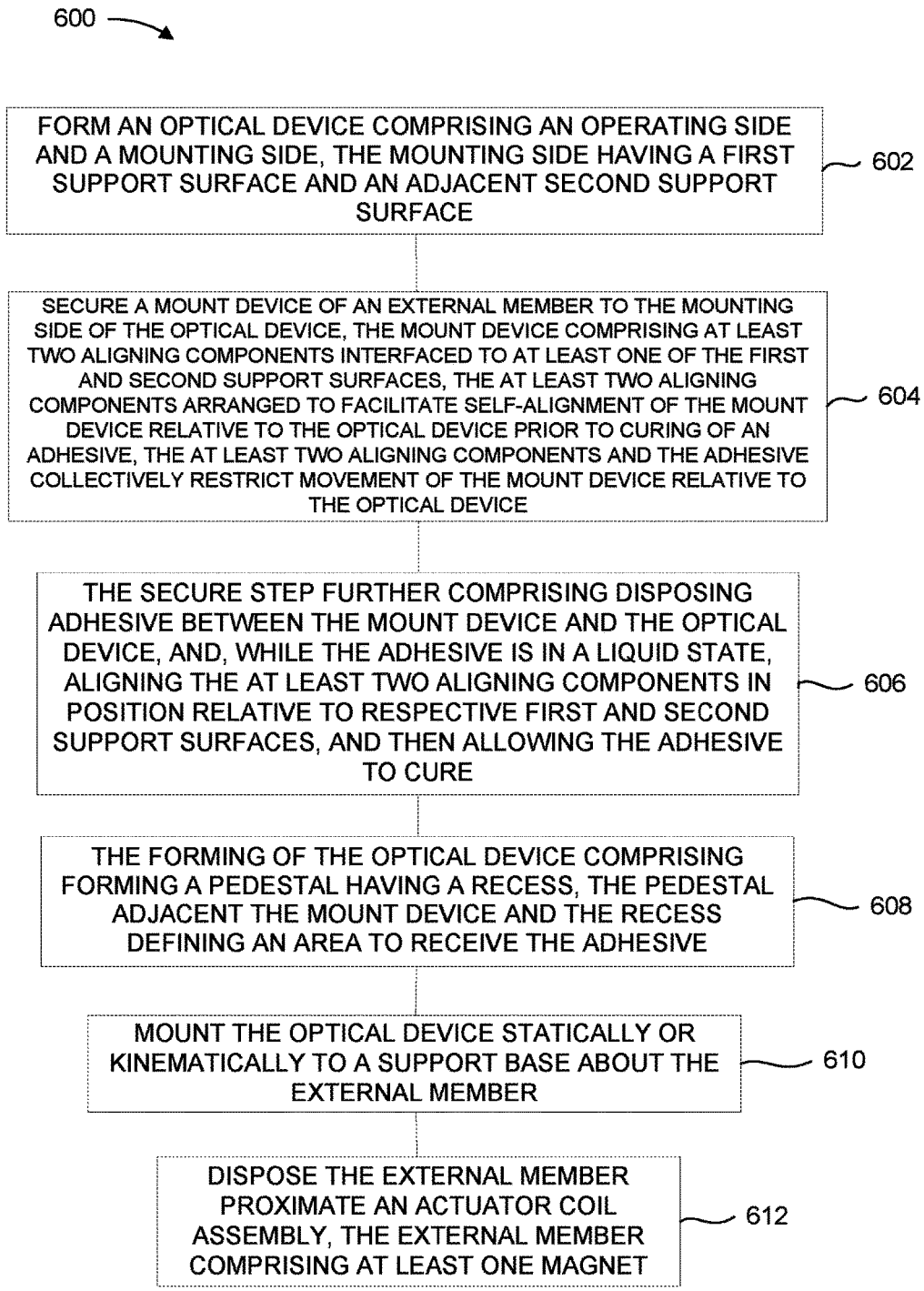
FIG. 12 is a flow chart illustrating a method of mounting a platform, in accordance with an example of the present disclosure.

FIG. 12 illustrates a method 600 of mounting an optical device to an external member, such as the method of mounting the magnetic assembly 108a-d of FIGS. 1-3 and 7-9 to the mirror platform (i.e., an optical device) described therein. The method 600 can comprise step 602 of forming an optical device comprising an operating side and a mounting side (e.g., the mirror platform discussed regarding FIGS. 1-9). The optical device can be formed by existing methods of making a uniform beryllium mirror, for instance The mounting side can have a first support surface and an adjacent second support surface (e.g., 312a and 312b discussed regarding FIG. 7B). A beryllium mirror can be machined or molded to create such support surfaces into a pedestal of the mirror, for example. Step 604 comprises securing a mount device of an external member to the mounting side of the optical device. The mount device can be the attachment pole piece discussed regarding FIGS. 7-9. The mount device can comprise at least two alignment components interfaced to at least one of the first and second support surfaces (e.g., see discussion of FIG. 9, specifically). The at least two alignment components can be arranged to facilitate self-alignment of the mount device relative to the optical device prior to curing of an adhesive. Such self-alignment is further discussed regarding method step 416 and regarding the discussion of FIGS. 7A-9. The at least two alignment components and the adhesive can collectively restrict movement of the mount device relative to the optical device. Step 606 can comprise a number of operations, including disposing adhesive between the mount device and the optical device, and, while the adhesive is in a liquid uncured state, aligning the at least two alignment components in position relative to respective first and second support surfaces, and then allowing the adhesive to cure (as further discussed regarding FIGS. 7A-9).

Step 608 comprises forming a pedestal having a recess, which can be formed by known methods of making particular features of an optical mirror, for example, such as machining or molding methods. The pedestal can be adjacent the mount device and the recess can define an area to receive the adhesive. Step 610 comprises statically mounting or kinematically mounting the optical device to a support base about the external member. The discussions regarding FIGS. 7A-9 describe an example of kinematically mounting a magnetic assembly 112a to the pedestal 308a of the platform 302, for example. However, a method of statically mounting an external member (e.g., magnetic actuator, rod, support structure, etc.) is disclosed whereby a static external member (e.g., having the attachment pole piece 314) is mounted to a static mirror via the attachment pole piece 314, as one example. Specifically, only the pole piece 314 would be statically mounted to the pedestal 308a and a static external member would be secured to the pole piece 314. Step 612 comprises at least partially disposing the external member proximate a coil actuator assembly, whereby the external member comprising at least one magnet, as further discussed regarding FIGS. 1-4).

It is to be understood that the examples of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

Reference throughout this specification to "one example" or "an example" means that a particular feature, structure, or characteristic described in connection with the example is included in at least one example of the present invention. Thus, appearances of the phrases "in one example" or "in an example" in various places throughout this specification are not necessarily all referring to the same example.

As used herein, various examples of the present invention can be referred to herein along with alternatives for the various components thereof. It is understood that such examples and alternatives are not to be construed as de facto equivalents of one another, but are to be considered as separate and autonomous representations of the present invention.

Furthermore, the described features, structures, or characteristics can be combined in any suitable manner in one or more examples. In the description, numerous specific details are provided, such as examples of lengths, widths, shapes, etc., to provide a thorough understanding of examples of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the inventive concepts in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A magnetic actuator, comprising:
   a first magnet having a first magnetic axis and a first magnetic field;
   a second magnet having a second magnetic axis and a second magnetic field, the first and second magnets defining, at least in part, a magnetic assembly; and
   a coil actuator assembly comprising a housing through which the magnetic assembly is at least partially disposed, wherein the first and second magnetic fields collectively approximate a curve, wherein the magnetic assembly is curved to maximize clearance of the magnetic assembly relative to the housing when the magnetic assembly is actuated relative to the housing, thereby minimizing a size of the housing,
   wherein the coil actuator assembly further comprises a coil wrapped around the housing, such that, in response to supplying a voltage to the coil, the magnetic assembly is actuated relative to and through an opening of the housing, and
   wherein the magnetic assembly is coupleable to an optical device, such that actuation of the magnetic assembly by the coil actuator assembly causes the magnetic assembly and the optical device to rotate relative to the housing.

2. The magnetic actuator of claim 1, wherein the first magnet is positioned relative to the second magnet to angularly offset the respective magnetic axes.

3. The magnetic actuator of claim 1, wherein the magnetic assembly comprises a plurality of stacked magnets, wherein at least one of the first and second magnets has a tapered cross-section having a magnetic axis angularly offset from a magnetic axis of another magnet in the magnetic assembly.

4. The magnetic actuator of claim 1, wherein at least one of the first and second magnets comprises a wedge-shape design.

5. The magnetic actuator of claim 1, wherein the first and second magnets comprise opposing curved surfaces, such that opposing surfaces of the magnet assembly are curved.

6. The magnetic actuator of claim 1, further comprising third, fourth, and fifth magnets stacked on the first and second magnets, wherein each magnet has a magnetic axis, and wherein at least some of the magnetic axes are angularly offset from one another.

7. The magnetic actuator of claim 1, further comprising an attachment pole piece secured to an end of the magnetic assembly.

8. The magnetic actuator of claim 7, wherein the attachment pole piece comprises at least two alignment components.

9. The magnetic actuator of claim 1, wherein the magnet assembly includes a plurality of stacked magnets attached together, wherein adjacent magnets of the stack are arranged such that north and south poles of the adjacent magnets are positioned in an alternating manner.

10. A tilt platform assembly, comprising:
    a support base;
    a tilt platform pivotally coupled to the support base;
    at least one coil actuator assembly, mounted to one of the support base or the tilt platform; and
    at least one magnet assembly mounted to the other of the support base or tilt platform, and being disposable within the at least one coil actuator assembly, the at least one magnetic assembly comprising at least two magnets having respective magnetic fields angularly offset from one another and that collectively approximate a curve,
    wherein the at least one coil actuator assembly further comprises a housing and a coil wrapped around the housing, and wherein the at least one magnetic assembly is moveable through the housing in response to a voltage applied to the coil, thereby pivoting the tilt platform relative to the support base.

11. The tilt platform assembly of claim 10, wherein each of the at least two magnets has a magnetic axis about their north and south poles, and wherein at least some of the magnetic axes are angularly offset from one another.

12. The tilt platform assembly of claim 10, wherein each of the at least two magnets has a wedge-shape design and combine to approximate a curve in the magnet assembly.

13. The tilt platform assembly of claim 10, wherein the at least two magnets has an outer surface height dimension greater than an inner surface height dimension.

14. The tilt platform assembly of claim 10, wherein the inner surface height dimensions of the at least two magnets are arranged adjacent one another to form a nonlinear magnet assembly.

15. The tilt platform assembly of claim 10, wherein the at least two magnets comprise opposing curved surfaces that combine to provide the magnet assembly with opposing curved surfaces.

16. The tilt platform assembly of claim 10, wherein the at least two magnets comprise five magnets each having a magnetic axis, the five magnets secured to each other in a stack, wherein at least some of the magnetic axes are angularly offset from one another.

17. The tilt platform assembly of claim 10, wherein the magnet assembly further comprises an attachment pole piece secured to an end of the at least two magnets.

18. The tilt platform assembly of claim 17, wherein the platform includes a first support surface and an adjacent second support surface, wherein the attachment pole piece comprises at least two alignment components interfaced to at least one of the first and second support surfaces, the at least two alignment components arranged to facilitate self-alignment of the attachment pole piece relative to the platform prior to curing of an adhesive between the platform and the attachment pole piece, the at least two alignment components and the adhesive collectively restricting movement of the attachment pole piece relative to the platform.

19. The tilt platform assembly of claim 10, further comprising four magnetic assemblies, each attached approximately to corner areas of the tilt platform, and further comprising four coil actuator assemblies, each attached to the support base and positioned to receive and actuate a corresponding magnet assembly to pivot the tilt platform.

20. The tilt platform assembly of claim 10, wherein the at least one coil actuator assembly includes a housing having an opening through which the magnetic assembly is at least partially disposed.

21. The tilt platform assembly of claim 20, wherein the housing has a central axis that is non-perpendicular to a planar operating side of the tilt platform.

22. The tilt platform assembly of claim 10, wherein the magnet assembly includes a plurality of magnets stacked on each other and attached together, wherein magnets of the stack are arranged such that north and south poles of adjacent magnets are positioned in an alternating manner.

23. The tilt platform assembly of claim 10, wherein the tilt platform comprises a mirror or other optical device.

24. The tilt platform assembly of claim 10, wherein the assembly is at least part of a fast steering mirror assembly.

25. The system of claim 10, wherein the at least one magnetic assembly is curved to maximize clearance of the at least one magnetic assembly relative to an opening of the housing when the at least one magnetic assembly is actuated relative to the housing, thereby minimizing a size of the housing.

* * * * *